United States Patent
Miazgowicz et al.

(10) Patent No.: US 9,243,550 B2
(45) Date of Patent: Jan. 26, 2016

(54) TURBOCHARGER COMPRESSOR INLET FLOW CONTROL

(75) Inventors: Keith D. Miazgowicz, Dearborn, MI (US); Ahsanul Karim, Canton, MI (US); Kevin Payne, Belleville, MI (US); Adam Michael Christian, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 570 days.

(21) Appl. No.: 13/418,207

(22) Filed: Mar. 12, 2012

(65) Prior Publication Data

US 2013/0232971 A1    Sep. 12, 2013

(51) Int. Cl.
| F02B 33/44 | (2006.01) |
| F02M 25/07 | (2006.01) |
| F02B 37/16 | (2006.01) |
| F02B 37/10 | (2006.01) |

(52) U.S. Cl.
CPC .............. *F02B 37/16* (2013.01); *F02B 37/10* (2013.01); *Y02T 10/144* (2013.01)

(58) Field of Classification Search
CPC .......... F02B 37/16; F02B 37/00; F02B 21/00; F02M 25/071; F02M 25/0722; F02D 9/02; Y02T 10/144; Y02T 10/146
USPC .................. 60/611, 605.1, 605.2; 123/568.17
See application file for complete search history.

(56) References Cited

U.S. PATENT DOCUMENTS

| 2,656,096 | A | * | 10/1953 | Schwarz | 415/58.4 |
| 4,227,372 | A | * | 10/1980 | Kakimoto et al. | 60/611 |
| 4,373,337 | A | * | 2/1983 | Widmann | 60/611 |
| 4,505,117 | A | * | 3/1985 | Matsuoka | 60/609 |
| 4,817,387 | A | * | 4/1989 | Lashbrook | 60/611 |
| 4,870,822 | A | * | 10/1989 | Kamimaru | 60/611 |
| 6,138,651 | A | * | 10/2000 | Mori et al. | 123/568.17 |
| 6,517,309 | B1 | * | 2/2003 | Zaher | 415/58.4 |
| 6,813,887 | B2 | * | 11/2004 | Sumser et al. | 60/611 |
| 7,021,058 | B2 | * | 4/2006 | Scheinert | 60/611 |
| 7,243,641 | B2 | * | 7/2007 | Zukouski | 123/568.17 |
| 7,281,378 | B2 | * | 10/2007 | Gu et al. | 60/605.2 |
| 7,685,819 | B2 | * | 3/2010 | Vetrovec | 60/611 |
| 7,721,542 | B2 | * | 5/2010 | Chen | 60/611 |
| 7,966,815 | B2 | * | 6/2011 | Kipping et al. | 60/611 |
| 8,287,232 | B2 | * | 10/2012 | Gu et al. | 415/56.5 |
| 8,434,305 | B2 | * | 5/2013 | Donkin et al. | 60/611 |
| 2005/0188693 | A1 | | 9/2005 | Schmid et al. | |
| 2005/0198957 | A1 | * | 9/2005 | Kim | 60/611 |
| 2007/0224032 | A1 | * | 9/2007 | Gu et al. | 415/58.4 |
| 2010/0205949 | A1 | | 8/2010 | Bolda et al. | |

(Continued)

FOREIGN PATENT DOCUMENTS

| CA | 2500146 A1 | * | 9/2006 | F02F 1/34 |
| DE | 102004043545 | * | 3/2006 | F01M 13/00 |
| JP | 59101539 A | * | 6/1984 | F02B 37/00 |
| JP | 09310699 A | * | 12/1997 | F04D 29/44 |

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Systems and methods for controlling compressor inlet flow in a turbocharger of an engine are described. In one example, a method for controlling a compressor inlet flow of an engine turbocharger system includes: directing air from a high pressure source to an inlet upstream of a compressor wheel via a conduit coupled to the inlet and the high pressure source, where the conduit is obliquely coupled to the inlet.

10 Claims, 6 Drawing Sheets

(56) References Cited

U.S. PATENT DOCUMENTS

2010/0269804 A1* 10/2010 Miyaji .......................... 123/572
2011/0011084 A1   1/2011 Yanagida et al.
2012/0297769 A1* 11/2012 Gerum .......................... 60/611

FOREIGN PATENT DOCUMENTS

JP    2006207506 A  *  8/2006  .............. F02B 37/00
JP    2007154675 A  *  6/2007  .............. F02B 37/16

* cited by examiner

TURBOCHARGER COMPRESSOR INLET FLOW CONTROL

BACKGROUND AND SUMMARY

Engines may use a turbocharger to increase engine torque/power output density. In one example, a turbocharger may include a compressor and a turbine connected by a drive shaft, where the turbine is coupled to the exhaust manifold side and the compressor is coupled to the intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, such as with a wastegate.

However, when matching a turbocharger to an engine, there is a constant trade-off between low end torque capability limits from surge, and high end performance limited by flow losses and turbine sizing. In order to address these issues, devices such as Inlet Guide Vanes (IGV), compressor housing grooves, and casing treatments can be implemented into the turbocharger design. However, the inventors herein have recognized that such devices may adversely affect the high end performance flow losses since such approaches are intrusive into the flow field or boundary layer, and may lead to limits on the high end compressor flow capacity, reduced peak performance capabilities of the engine, and Noise Vibration and Harshness (NVH) issues. Further, the inventors herein have recognized that attempts to improve the high end flow capacity of a compressor via adjusting wheel diameter, aspect ratio, and Air/Radius (A/R) ratio may also adversely affect the low end performance capability and transient response of the engine.

As one example, the above issues may be addressed by a method for controlling a compressor inlet flow of an engine turbocharger system comprising: directing air from a high pressure source to an inlet upstream of a compressor wheel via a conduit coupled to the inlet and the high pressure source, where the conduit is obliquely coupled to the inlet.

In this way, the compressor inlet velocity flow field can be tailored and controlled to increase the efficiency of the compressor rotor, increasing the surge margin of the compressor, reducing low end NVH effects such as tip-in and tip-out whoosh, improving transient response characteristics such as time-to-torque, and minimizing the high end flow loss effects associated intrusive devices, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
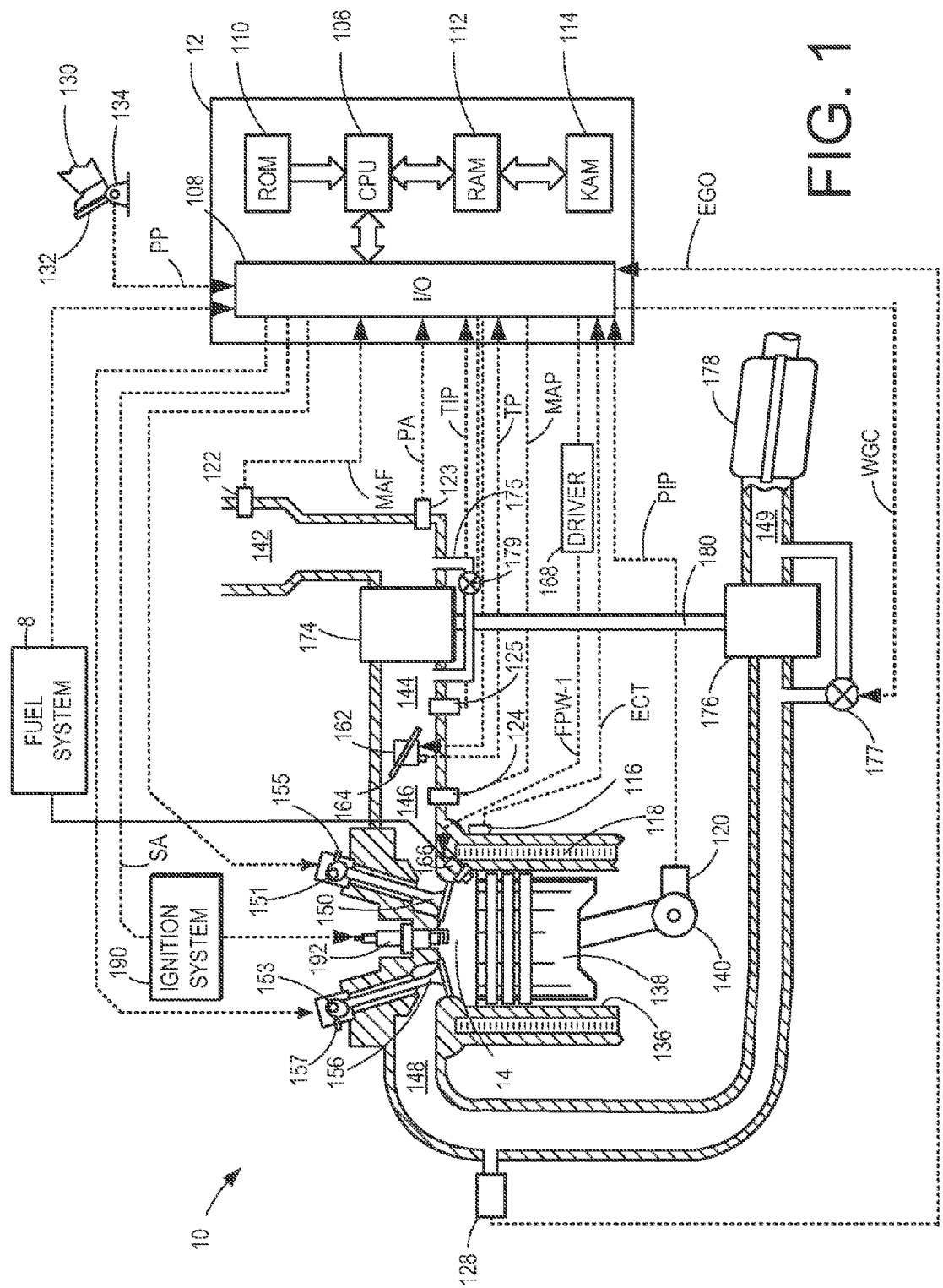
FIG. 1 shows a block diagram of a turbocharged engine.
Figure 2:
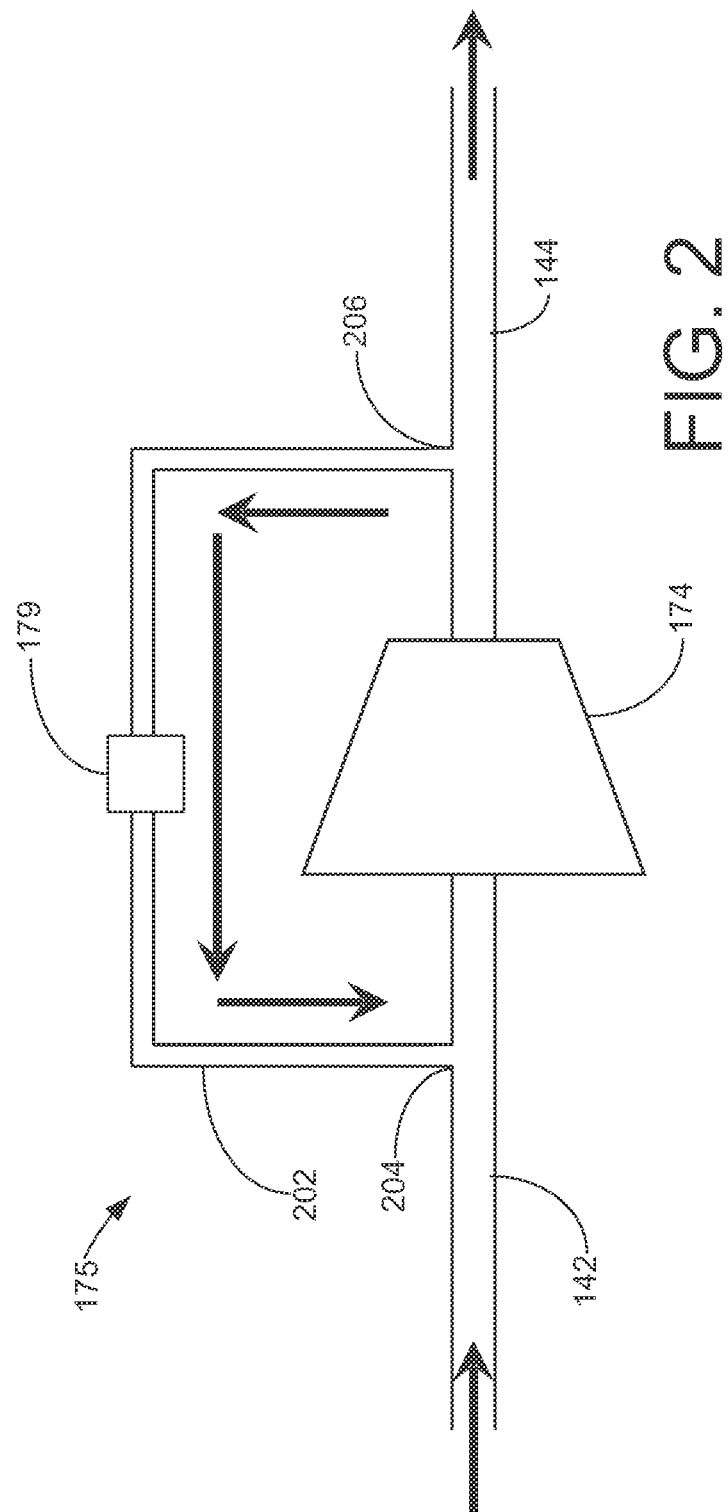
FIGS. 2-3 show example compressor inlet flow control systems in accordance with the disclosure.
Figure 3:
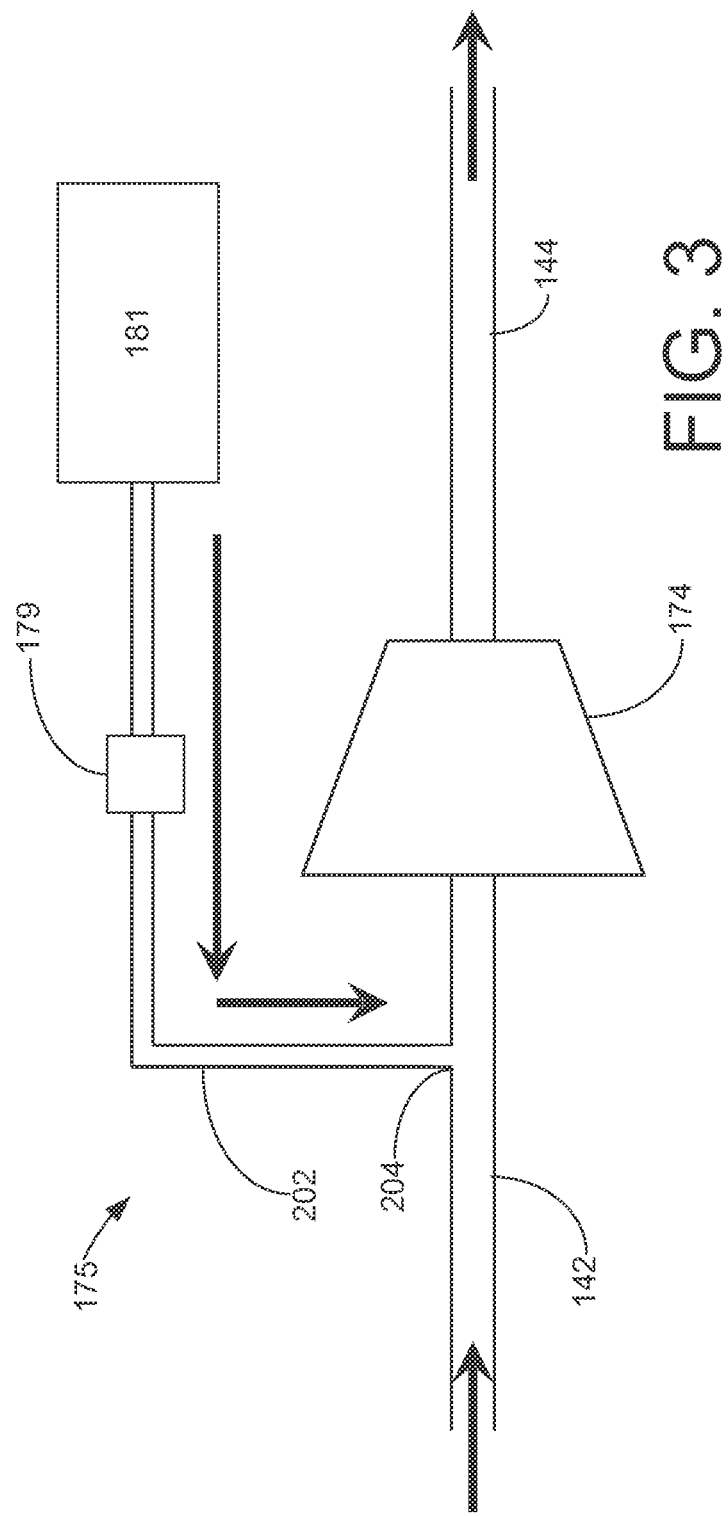

The following description relates to systems and methods for controlling compressor inlet flow in a turbocharger of an engine, such as the engine shown in FIG. 1. As one example, a compressor bypass conduit, such as shown in FIG. 2, may be used to direct pressurized air from downstream the compressor to the compressor inlet. As another example, a conduit may be used to direct pressurized air from a high pressure source to the compressor inlet, as shown in FIG. 3. The compressor bypass conduit design may be based on various components of the compressor, such as shown in FIG. 3, so that the compressor inlet velocity flow field can be tailored and controlled to increase the efficiency of the compressor rotor, increasing the surge margin of the compressor, reducing low end NVH effects such as tip-in and tip-out whoosh, improving transient response characteristics such as time-to-torque, and minimizing the high end flow loss effects associated intrusive devices, for example.

FIG. 1 shows an example of a turbocharged engine. Internal combustion engine 10 comprises a plurality of cylinders, one cylinder of which is shown in FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a turbocharger boosting device. For example, engine 10 is configured with a turbocharger including a compressor 174 arranged between intake passages 142 and 144, and an exhaust turbine 176 arranged between exhaust passages 148 and 149. Specifically, air passage 142 is connected to the compressor inlet, air passage 144 is connected to the compressor outlet, exhaust passage 148 is connected to the turbine inlet, and exhaust passage 149 is connected to the turbine outlet.

As described in more detail below, in some examples a compressor bypass conduit 175 may be included in intake air passages 142 and 144 and configured to extract air flow from downstream compressor 174 and direct compressor bypass air to an inlet positioned upstream of compressor 174. In some examples, compressor bypass conduit 175 may include a metering device 179 disposed therein, e.g., a compressor bypass valve, an orifice, etc. In other examples, as shown in FIG. 3 described below, conduit 175 may be coupled with a high pressure air source, e.g., an external pump reservoir, twin turbo applications, etc, so that high pressure air may be directed to the intake 142 upstream of compressor 174.

Compressor 174 may be at least partially powered by exhaust turbine 176 via a shaft 180. Wastegate 177 includes a path for exhaust gasses to flow from exhaust passage 148 away from turbine 176 to exhaust passage 149. The energy supplied by turbine 176 may be controlled by controlling the amount of exhaust gas reaching turbine 176 from exhaust passage 148. Specifically, the boost pressure may be adjusted by the WGC signal received from controller 12 by modulating a degree of opening, and/or a duration of opening, of a wastegate valve.

In the example embodiment, wastegate 177 is pneumatically actuated to control the wastegate valve and hence the boost pressure. In what is known as a "boost-based" wastegate configuration, wastegate 177 comprises a solenoid valve including a first port (not shown) connected to intake passage 146 and a second port (not shown) connected to an intake passage at atmospheric pressure, such as intake passage 142. The pressure of the first port is at the boost pressure and may be measured with sensor 125. The measurement may be sent to controller 12 via the TIP signal. Atmospheric pressure may be measured by sensor 123 and the measurement may be transmitted to controller 12 via the PA signal. In the example embodiment, the wastegate valve is normally closed, but force supplied by the boost pressure may be used to open the wastegate valve.

A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of turbine 176 and emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passages 148 and 149. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The opening and closing of the valves may be controlled by hydraulically actuated lifters coupled to valve pushrods, or via a cam profile switching mechanism. For example, intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In one specific example, twin independent variable cam timing may be used, where each of the intake cam and the exhaust cam can be independently adjusted by the control system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 1 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; throttle inlet pressure (TIP) from sensor 125, and absolute manifold air pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 124 may be used to provide an indication of vacuum, or pressure, in the intake manifold. Further, manifold pressure may be estimated based on other operating parameters, such as based on MAF and RPM, for example.

Turning now to FIG. 2, a schematic diagram of a compressor bypass system 175 is shown. Compressor bypass system 175 includes a bypass conduit 202 coupled to intake passage 142 upstream of compressor 174 and coupled to intake passage 144 downstream of compressor 174. In particular, bypass conduit 202 is coupled to intake passage 142 at an inlet flow control entrance location 204 upstream of compressor 174 and coupled to a flow control extraction location outlet 206, downstream of compressor 174. However, in other examples bypass conduit 202 may be coupled to various other components downstream of compressor 174. For example, bypass conduit 202 may be coupled to an intake manifold in an engine, a charge air cooler coupled in the intake, etc.

Compressor bypass conduit directs high pressure outlet air from downstream the compressor to conduit 142 so that the high pressure air is mixed with the low pressure inlet air flowing through intake conduit 142. In this way, an increase in air flow driving compressor 174 may be achieved.

Further, in some examples bypass conduit 202 may include a metering device 179 disposed therein between the outlet downstream of the compressor and the inlet upstream of the compressor so that an amount of bypass air may be adjusted. Metering device 179 may be any suitable device for controlling air flow passively or actively through the bypass conduit, e.g., a compressor bypass valve or an orifice. Metering device 179 may be controlled by controller 12 and may be adjusted in response to various engine operating conditions, e.g., boosts requests, throttle changes, engine load, tip-in or tip-out, etc. For example, metering device 179 may be adjusted in response to a turbocharger spool-up condition to increase an amount of air flowing through bypass conduit 202 and in turn increase response time of compressor 174.

Turning now to FIG. 3, a schematic diagram of another embodiment of a compressor inlet flow control system 175 is shown. Compressor inlet flow control system 175 includes a conduit 202 coupled to intake passage 142 upstream of compressor 174 and coupled to a high pressure source 181. High pressure air source 181 may be any suitable high pressure air source, e.g., an external pump reservoir, a twin turbo application, etc, so that high pressure air may be directed to the intake 142 upstream of compressor 174.

In particular, conduit 202 is coupled to intake passage 142 at an inlet flow control entrance location 204 upstream of compressor 174 and coupled to an outlet flow control extraction location at high pressure source 181.

Compressor bypass conduit directs high pressure outlet air from high pressure source 181 to conduit 142 so that the high pressure air is mixed with the low pressure inlet air flowing through intake conduit 142. In this way, an increase in air flow driving compressor 174 may be achieved.

Further, as described above, in some examples conduit 202 may include a metering device 179 disposed therein between the high pressure source 181 and the inlet upstream of the compressor so that an amount of high pressure air delivered upstream of compressor 174 may be adjusted.

Figure 4:
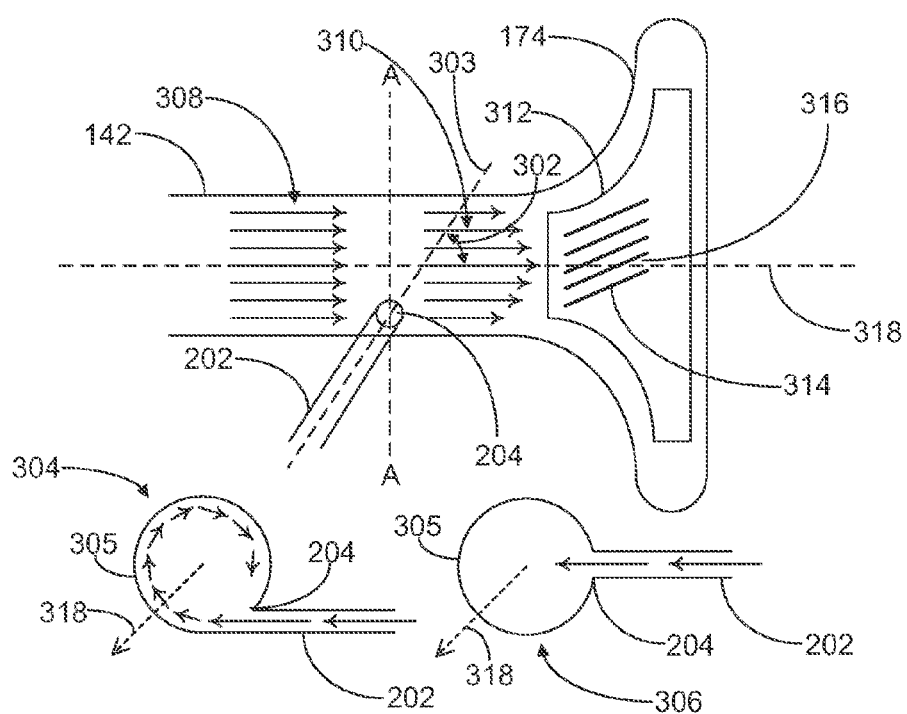
FIG. 4 shows example bypass inlets upstream of a compressor.

As remarked above, the compressor inlet flow control system design may be based on various components of the compressor so that the compressor inlet velocity flow field can be advantageously tailored and controlled to increase the efficiency of the compressor operation. Thus, FIG. 4 shows example coupling configurations of bypass conduit 202 and bypass inlet 204 upstream of compressor 174. In particular, bypass conduit 202 may be coupled to bypass inlet 204 in a variety of ways in order to increase and/or accelerate air flow entering compressor 174 and thus may be based on various components of compressor 174, e.g., based on a compressor blade incidence angle as described below.

For example, an inlet angle 302 between a central axis 303 of bypass conduit 202 and a central axis 318 of compressor 174 may be chosen in order to tailor an amount and/or direction of bypass gasses entering compressor 174. As one example, inlet angle 302 may be substantially 90° so that bypass conduit 202 is coupled to inlet 204 substantially perpendicular to an outer surface of intake conduit 142. As another example, inlet angle 302 may be a predetermined non-zero angle less than 90° so that bypass air entering intake 142 upstream of compressor 174 is directed downstream towards compressor 174. As still another example, inlet angle 302 may be a predetermined non-zero angle greater than 90° so that bypass air entering intake 142 upstream of compressor 174 is directed upstream away from compressor 174.

Example cross-sectional configurations of a coupling between bypass conduit 202 and inlet 204 are shown at 304 and 306. In particular, the example configurations shown a 304 and 306 are cross-sections A-A of intake conduit 142. The cross-sections A-A are perpendicular to central axis 318 of compressor 174. As a first example, as shown at 304, bypass conduit 202 may be coupled to inlet 204 tangentially to a circumference 305 of intake passage 142 so that bypass air entering intake conduit 142 upstream of compressor 174 may produce a swirl or other air pressure gradient in the air entering compressor 174 around central axis 318. For example, a flow field 308 of air upstream of inlet 204 in intake conduit 142 may be substantially uniform and may lack significant pressure gradients, such as swirl. However, with the configuration shown at 304, a flow field 310 of air downstream of inlet 204 in intake conduit 142 may not be uniform and may include pressure gradients, such as a swirling gradient. As another example, as shown at 306, bypass conduit 202 may be coupled to inlet 204 perpendicularly to circumference 305 intake passage 142 so that bypass air entering intake conduit 142 upstream of compressor 174 may produce an increased air pressure gradient in a vicinity of inlet 204.

Figure 6:
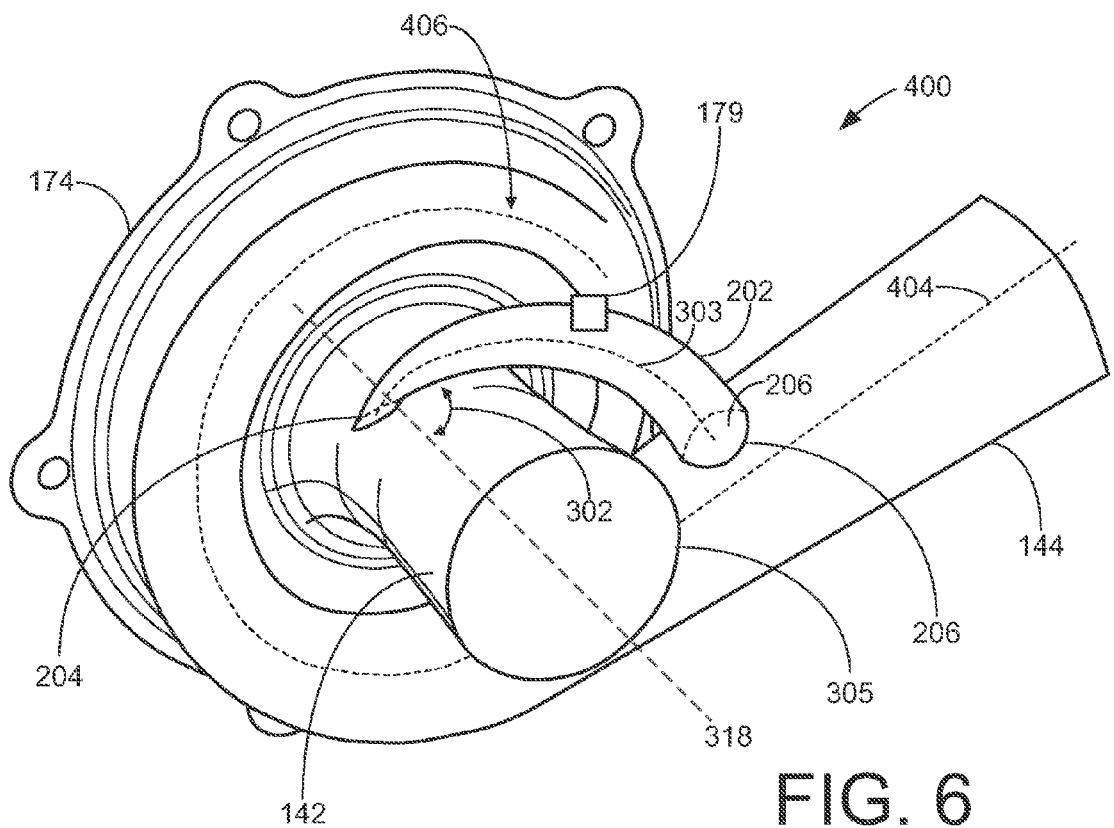
FIG. 6 shows an example coupling configuration of a bypass conduit with a compressor.

As remarked above, the configuration of the coupling between bypass conduit 202 and inlet 204 may be pre-determined based on various components of compressor 174. For example, compressor 174 includes a rotor housing 312 which includes rotor or compressor blades 314. Each compressor blade may form a blade angle 316 relative to the central axis 318 of compressor 174. Thus, in some examples, bypass conduit 202 may be obliquely coupled to inlet 204 at a predetermined angle 302 from central axis 318 of the compressor. Further, as shown in FIG. 6 described below, the coupling of bypass conduit 202 with inlet 204 may be radially offset from central axis 318 so that bypass conduit 202 does not intrude on the air flow entering compressor 174. Further, in some examples, in addition to being based on the compressor blade incidence angle 316 of compressor 174, predetermined angle 302 may also be determined based a desired compressor inlet flow rate.

For example, angle 302 may be chosen so that bypass conduit 202 is at a substantially similar angle as the compressor blades 314 so that a nearly constant air flow is directed toward the compressor blades. As another example, angle 302 may be chosen so that bypass conduit 202 forms a smaller angle than the compressor blades 314 so that a less air flow is incident with the compressor blades. As still another example, angle 302 may be chosen so that bypass conduit 202 forms a larger angle than the compressor blades 314 so that a greater or more accelerated air flow is incident with the compressor blades.

Similarly, in some examples, coupling configurations of bypass conduit 202 and bypass outlet 206 downstream of compressor 174 may be chosen based on various factors. For example, the angle that bypass conduit 202 forms with bypass outlet 206 may be based on a desired bypass flow rate.

Figure 5:
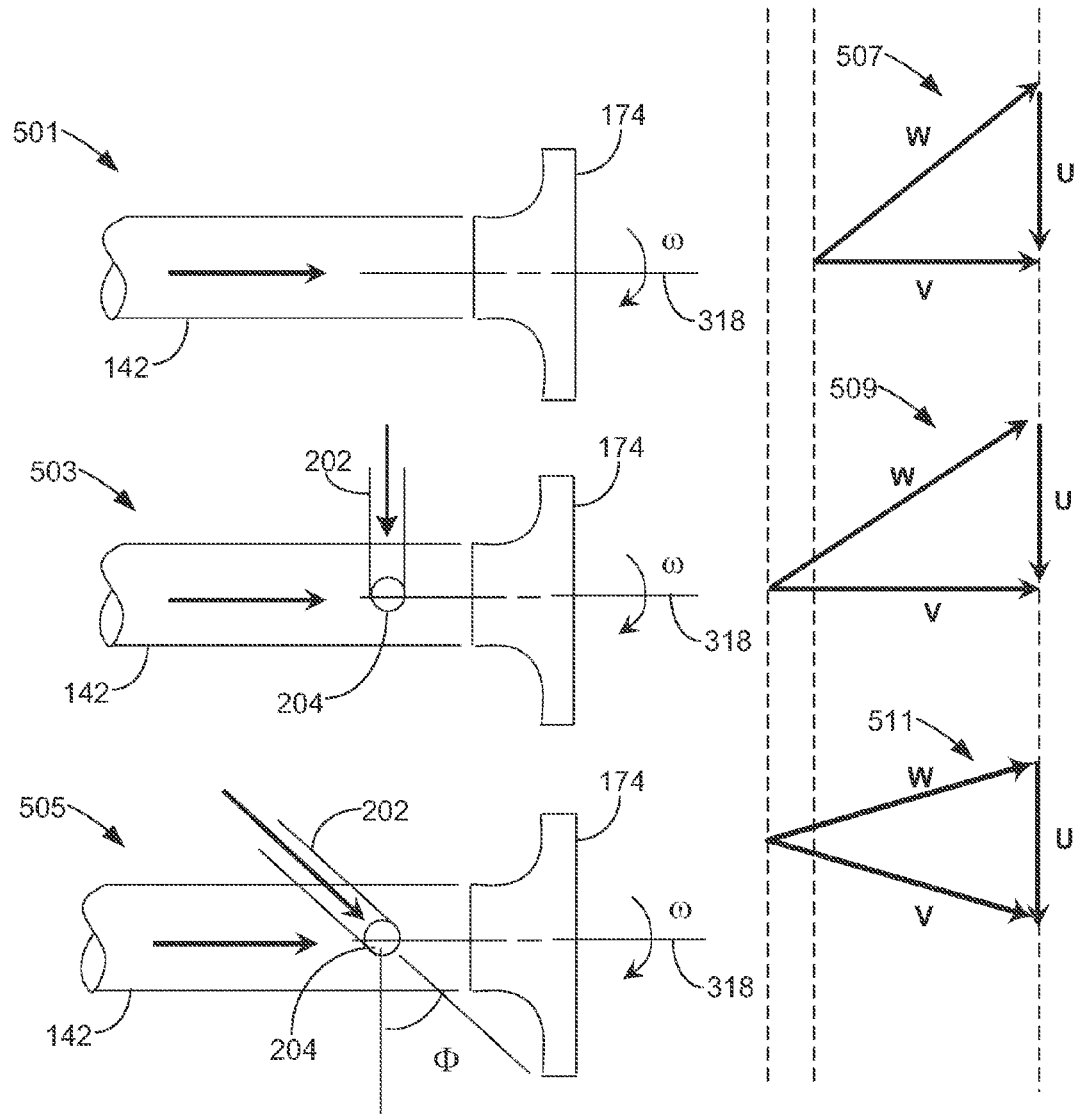
FIG. 5 shows example compressor inlet velocity triangles.

FIG. 5 shows example compressor inlet velocity triangles comparing an example configuration without a compressor inlet flow control system shown at 501 with example configurations with a compressor inlet flow control systems shown at 503 and 505. In FIG. 5, $\omega$ is an RPM of compressor 174 about central axis 318, U is compressor tip speed, V is the inlet flow velocity vector, W is relative inlet flow vector to the compressor blade, and $\Phi$ is an angle of incidence of the coupling of conduit 202 with intake conduit 142 upstream of compressor 174.

The configuration shown at 501 does not include a compressor inlet flow control system and is included for comparison. Velocity triangle 507 corresponds to configuration 501. The configuration shown at 503 includes a compressor inlet flow control system including conduit 202 coupled to inlet 204 upstream of compressor 174. In configuration 503, conduit 202 is coupled to inlet 204 perpendicularly to intake conduit 142, for example as shown at 306 in FIG. 4 described above. As shown in the velocity triangle 509 corresponding to configuration 503, the inlet flow velocity vector V and the relative inlet flow vector to compressor blade W are increased relative to the inlet flow velocity vector V and the relative inlet flow vector to compressor blade W in velocity triangle 507 corresponding to configuration 501. However, in both configurations the compressor tip speed U remains substantially unchanged. This increase in the inlet flow velocity vector V and the relative inlet flow vector to compressor blade W may result in an increased transient response, or decreased spool-up time, of compressor 174 during tip-in or tip-out conditions, for example.

The configuration shown at 505 includes a compressor inlet flow control system including conduit 202 coupled to inlet 204 upstream of compressor 174. In configuration 505, conduit 202 is coupled to inlet 204 at an angle $\Phi$ which may be determined to optimize the compressor blade incident angle as described above with regard to FIG. 4. As shown in the velocity triangle 511 corresponding to configuration 505, the inlet flow velocity vector V and the relative inlet flow vector to compressor blade W are increased relative to the inlet flow velocity vector V and the relative inlet flow vector to compressor blade W in velocity triangle 509 corresponding to configuration 503. Velocity triangle 511 corresponding to configuration 505 may result in more efficient air flow delivered to compressor 174 since $\Phi$ is determined so that high pressure air entering inlet 204 is incidence with the compressor blades. This increase in the inlet flow velocity vector V and the relative inlet flow vector to compressor blade W may result in an increased transient response, or decreased spool-up time, of compressor 174 during tip-in or tip-out conditions, for example.

FIG. 6 shows an example coupling configuration 400 of bypass conduit 202 with an inlet 204 disposed in intake 142 upstream of compressor 174. Example configuration 400 is shown approximately to scale. As shown in FIG. 6, bypass conduit 202 is obliquely coupled to inlet 204 so that bypass conduit is neither parallel nor perpendicular with central axis 318 of compressor 174. Further, in some examples, as shown in FIG. 6, bypass conduit 202 may be curved at least partially around a circumference 205 of intake conduit 142 in order to decrease packaging constraints and increase circumferential air pressure gradients in the air entering compressor 174.

In particular, bypass conduit 202 is coupled to conduit 144 at outlet 206 downstream of compressor 174. In some examples, as shown in FIG. 6, a central axis 303 of bypass conduit 202 adjacent to outlet 206 may be substantially perpendicular to a central axis 404 of conduit 144. Conduit 144 curves around compressor 179 and, in some examples, as shown in FIG. 6, a curvature of central axis 303 of bypass conduit 202 may be substantially the same as a curvature of a portion of the central axis 404 of conduit 406, e.g., in a region of conduit 144 adjacent to the compressor body at 406.

Bypass conduit is coupled to intake conduit 142 at an inlet 204 upstream of compressor 174 and is radially offset form a central axis 318 of conduit 142 so that bypass conduit does not intrude upon the air flow entering compressor 174 via conduit 142. Further, bypass conduit 202 is coupled to conduit 142 at an angle 302 so that a distance of the coupling of bypass conduit 202 with inlet 204 from the body of compressor 174 is less than a distance of the coupling of bypass conduit 202 with outlet 206 in conduit 144.

Further, as remarked above, central axis 404 of conduit 144 may have a curvature as it wraps around the body of compressor 174. In some examples, central axis 303 of bypass conduit 202 may have a curvature similar to the curvature of conduit 144 at the compressor body, e.g., near 406. In this way, air flow entering intake conduit 142 via bypass conduit 202 may be directed along a curved flow path about central axis 318 of intake conduit 142 through the compressor.

Figure 7:
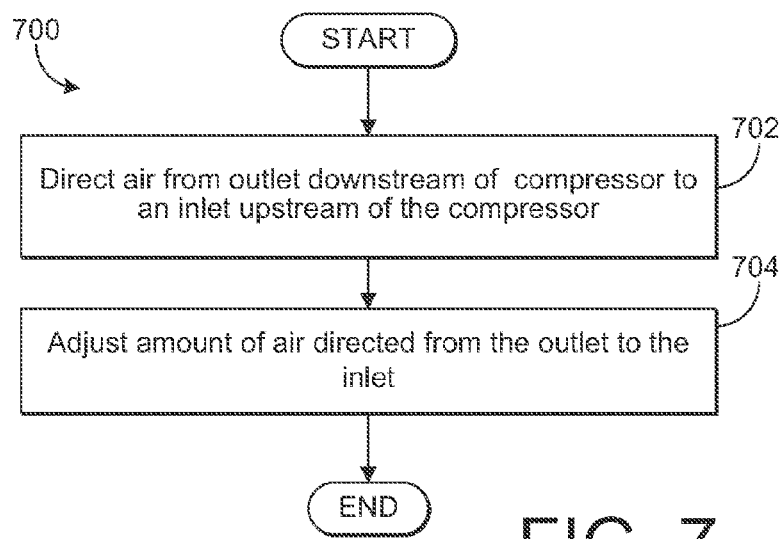
FIG. 7 shows an example method for controlling compressor inlet flow in an engine turbocharger system.

Such non-intrusive bypass conduit configurations may reduce costs of components while increasing efficiency of turbocharger operation during select engine operating conditions such as tip-in, tip-out, turbocharger spool up, engine load changes, etc. For example, FIG. 7 shows an example method 700 for controlling compressor inlet flow in an engine turbocharger system.

At 702, method 700 includes directing air from an outlet downstream of a compressor, e.g., outlet 206, to an inlet upstream of the compressor, e.g., inlet 204. Since the outlet and inlet are disposed in a fresh air intake conduit, there is may be no exhaust gas circulated through the bypass conduit.

At 704, method 700 includes adjusting an amount of air directed from the outlet to the inlet. For example, an amount of air directed from the outlet to the inlet may be adjusted via a compressor bypass valve disposed in the bypass conduit between the outlet and the inlet or via an orifice disposed in the bypass conduit between the outlet and the inlet. Further, in some examples, the amount of air directed from the outlet to the inlet may be adjusted based on an engine operating condition, e.g., based on an engine load, engine RPM, a tip-in or tip-out request, etc. For example, metering device 179 may be adjusted to decrease an amount of bypass gas flowing through bypass conduit 202 during a first engine operating condition, e.g., during a low end torque operating condition, and may be adjusted to increase an amount of bypass gas flowing through bypass conduit 202 during a second engine operating condition, e.g., during high end torque operating conditions. In this way, the trade-off between low end torque capability limits from surge and high end performance limited by flow losses and turbine sizing may be compensated for by adjustment of metering device 179 leading to increased turbocharger efficiency.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types, fuel types, and turbocharger applications, e.g., a turbocharger used as an electric generator for a Hybrid Electric Vehicle (HEV) or other application.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling a compressor inlet flow of a compression system of an internal combustion engine comprising:
during an engine-on condition, adjusting an amount of flowing air from an outlet of a high pressure source to an inlet upstream of a compressor via a metering device disposed in a conduit coupled to the inlet and the high pressure source, where the conduit is obliquely coupled to the inlet and radially offset from a central axis of the conduit.

2. The method of claim 1, further comprising directing the amount of the flowing air through the compression system, the compression system comprising an engine turbocharger or supercharger system.

3. The method of claim 1, wherein the adjusting the amount of flowing air via the conduit further comprises directing the amount of the flowing air via a conduit coupled to the inlet tangentially to a circumference of an intake passage coupled to the compressor.

4. The method of claim 1, wherein the adjusting the amount of the flowing air via the conduit further comprises directing the amount of the flowing air via a conduit coupled to the inlet at a predetermined angle from a central axis of the compressor.

5. The method of claim 4, wherein the adjusting the amount of the flowing air via the conduit further comprises directing the amount of the flowing air via a conduit coupled to the inlet at a predetermined angle larger than an angle of a compressor blade of a compressor wheel from a central axis of the compressor wheel.

6. The method of claim 1, wherein the adjusting the amount of the flowing air comprises directing fresh air without exhaust gas.

7. The method of claim 1, further comprising adjusting the amount of the flowing air directed from the high pressure source to the inlet via the metering device;
wherein the metering device comprises an orifice disposed in the conduit between the high pressure source and the inlet.

8. A method for controlling a compressor inlet flow of a compression system in an internal combustion engine, comprising:
during engine operation and in response to an engine operating condition, adjusting an amount of air flow flowing from a high pressure source to an inlet upstream of a compressor wheel via a compressor bypass valve disposed in a conduit coupled to the high pressure source and the inlet, where the conduit is obliquely coupled to the inlet, wherein the conduit is coupled to the inlet at an angle from a central axis of the compressor wheel that is larger than an angle of a compressor blade of the compressor wheel from the central axis of the compressor wheel.

9. The method of claim 8, wherein controlling the compressor inlet flow of the compression system further comprises adjusting the compressor inlet flow of an engine turbocharger or supercharger system and the high pressure source is an outlet downstream of the compressor wheel.

10. The method of claim 8, wherein directing air comprises directing fresh air without exhaust gas, and the method further comprises adjusting the amount of air flow via the compressor bypass valve disposed in the conduit between the high pressure source and the inlet.

* * * * *